United States Patent
Drane

(10) Patent No.: US 7,208,680 B2
(45) Date of Patent: Apr. 24, 2007

(54) ROCK-N-LOCK NON-METALLIC SNAP-ON ELECTRICAL BOX

(75) Inventor: Mark R. Drane, Germantown, TN (US)

(73) Assignee: Thomas & Betts, International, Inc., Wilmington, DE (US)

( * ) Notice: Subject to any disclaimer, the term of this patent is extended or adjusted under 35 U.S.C. 154(b) by 0 days.

(21) Appl. No.: 11/399,635

(22) Filed: Apr. 6, 2006

(65) Prior Publication Data

US 2006/0243473 A1    Nov. 2, 2006

Related U.S. Application Data

(60) Provisional application No. 60/675,223, filed on Apr. 27, 2005.

(51) Int. Cl.
*H01H 9/02* (2006.01)

(52) U.S. Cl. .................. 174/58; 174/481; 174/53; 174/57; 220/3.2; 220/3.3; 248/906

(58) Field of Classification Search ........... 174/480, 174/481, 50, 53, 54, 57, 58, 61, 62, 63; 220/3.2, 220/3.3, 3.4, 3.5, 3.6, 3.7, 3.8, 3.9, 4.02; 248/343, 906, 200, 226.11, 228.6, 231.71; 211/26, 86.01; D13/152

See application file for complete search history.

(56) References Cited

U.S. PATENT DOCUMENTS

| | | | |
|---|---|---|---|
| 2,586,728 A | 2/1952 | Shepard | |
| 2,665,865 A | 1/1954 | Bell | |
| 3,097,821 A | 7/1963 | Richards | |
| 3,360,151 A | 12/1967 | Yznaga | |
| 3,474,994 A | 10/1969 | Swanquist | |
| 3,588,019 A * | 6/1971 | Cozeck | 248/906 |
| 3,720,395 A | 3/1973 | Schuplin | |
| 3,730,466 A | 5/1973 | Swanquist | |
| 3,780,209 A | 12/1973 | Schuplin | |
| 3,963,204 A | 6/1976 | Liss | |
| 3,977,640 A | 8/1976 | Arnold et al. | |
| 4,108,414 A | 8/1978 | Grant, Sr. | |
| 4,140,293 A * | 2/1979 | Hansen | 174/58 |
| 4,226,393 A | 10/1980 | Rardin et al. | |
| 4,362,284 A | 12/1982 | Bolante | |
| 4,447,030 A | 5/1984 | Nattel | |
| 4,483,453 A | 11/1984 | Smolik | |
| 4,693,438 A | 9/1987 | Angell | |
| 4,747,506 A | 5/1988 | Stuchlik, III | |
| 4,874,334 A | 10/1989 | Golden | |
| 4,971,280 A | 11/1990 | Rinderer | |
| 5,004,199 A * | 4/1991 | Suk | 248/906 |
| 5,239,132 A | 8/1993 | Bartow | |
| 5,408,045 A * | 4/1995 | Jorgensen et al. | 174/58 |
| 5,677,512 A | 10/1997 | Reiker | |
| 6,207,898 B1 | 3/2001 | Reiker | |
| 6,355,883 B1 * | 3/2002 | Gretz | 174/58 |

(Continued)

Primary Examiner—Angel R. Estrada
(74) Attorney, Agent, or Firm—Hoffmann & Baron

(57) ABSTRACT

A bracket assembly for supporting an electrical enclosure. The bracket assembly includes a bracket extending from an electrical enclosure and a flange extending from the bracket. The flange is designed to support one or more biasing structures which engage the support structure, such as a stud, to secure the bracket assembly thereto. The bracket assembly may further include gripping teeth to provide further securement thereto.

16 Claims, 4 Drawing Sheets

U.S. PATENT DOCUMENTS

| | | | |
|---|---|---|---|
| 6,389,658 B1 * | 5/2002 | Pfaller et al. ............... 248/906 |
| 6,484,979 B1 | 11/2002 | Medlin, Jr. |
| 6,484,980 B2 | 11/2002 | Medlin, Sr. et al. |
| 6,956,172 B2 * | 10/2005 | Dinh ........................ 174/58 |
| 2005/0127256 A1 * | 6/2005 | Johnson et al. |
| 2006/0131047 A1 * | 6/2006 | Dihn et al. |

* cited by examiner

US 7,208,680 B2

ROCK-N-LOCK NON-METALLIC SNAP-ON ELECTRICAL BOX

CROSS-REFERENCE TO RELATED APPLICATION

This application claims priority to U.S. Provisional Patent Application No. 60/675,223, filed on Apr. 27, 2005, which is incorporated herein by reference.

FIELD OF THE INVENTION

This invention pertains in general to an electrical enclosure, housing or assembly that is supported from a stud; and more particularly to a bracket affixed to the enclosure that once applied to the stud, requires no further operation, installation step or hardware for the supported enclosure to be in compliance with industry code.

BACKGROUND OF THE INVENTION

Electrical enclosures, frames, housings, boxes or the like are quite common and are extensively used to support fixtures to which high and low voltage wires are terminated. Examples of such fixtures are electrical switches, receptacles, telephone jacks, cable connections and other power or communication devices. Such enclosures supporting these fixtures are not free-standing and thus require support within the building structure if they are to be installed in accordance with local or national codes. These codes often specify a certain loading or series of forces the enclosure must withstand after being installed.

Perhaps the most common way of supporting such devices is via nails or screws inserted through openings in the device before being driven into a stud of the building. Other methods of securing the electrical enclosure to the building include a separate elongated metal bracket that spans between adjacent studs, the enclosure then being bolted or screwed to the bracket. Another method involves a metal bracket affixed directly to the box itself that is pushed onto or against a stud and then subsequently fastened in place via nails or screws.

As quick and simple as the above may appear, the operation of driving or fastening the nail or screw is still a secondary operation that must be completed after the box is initially positioned. This secondary operation requires time, some more than others, and thus prolongs the amount of time it takes to install the box in a fashion that will comply with local code. Such secondary operations also limit the number of boxes that may be installed in a given period of time.

To ease installation when it is known that a nail or screw is to be used, electrical outlet boxes are oftentimes made were the nail or screw is held captive on the device prior to installation. Thus, to cut down on the number of secondary steps required, the user need only drive the nail or screw home after the box is positioned against the stud. However, care has to be taken to insure that the step of screwing or nailing does not move the box out of position. Also, care has to be taken that this additional fastening hardware is not dropped or lost. Furthermore, the user has to be mindful of how the box is held during the driving operation so that the step of swinging a hammer or installing a screw does not inadvertently result in personal injury or damage to the enclosure.

Thus, it becomes desirable to avoid these secondary securement steps so that more boxes can be installed in the same period of time. It is also desirable to dispense with these separate fasteners or screws as this only adds cost and another assembly step in the manufacture of the final product. Furthermore, such fasteners can be lost. Safety is also a factor as one injury can result in considerable and quite unexpected cost and delay. Another desirable feature is to have the box automatically secured to the stud upon initial installation with no further operation required by the installer. Yet another desirable feature is a low cost box that can be secured as above while still complying with local codes and ordinances. These and other objects and advantages of this invention will be described in greater detail below.

SUMMARY OF THE INVENTION

A bracket assembly for supporting an electrical enclosure is configured having a bracket extending therefrom and with one side of the electrical enclosure having at least one stud gripping tooth affixed thereto. The bracket has a generally planar surface and a flange opposite the electrical enclosure with this electrical enclosure, the generally planar surface and the flange defining a stud receiving cavity therebetween. The flange is designed to support one or more biasing structure that extends into the stud receiving cavity with this biasing structure configured with at least another stud gripping tooth affixed thereto. Both of the stud gripping teeth extend into the stud receiving cavity. Wherein, upon the insertion of a stud into the stud receiving cavity, the stud engages and deflects the biasing structure thereby biasing the stud intermediate the stud gripping teeth.

DETAILED DESCRIPTION OF THE PREFERRED EMBODIMENT

Figure 1:
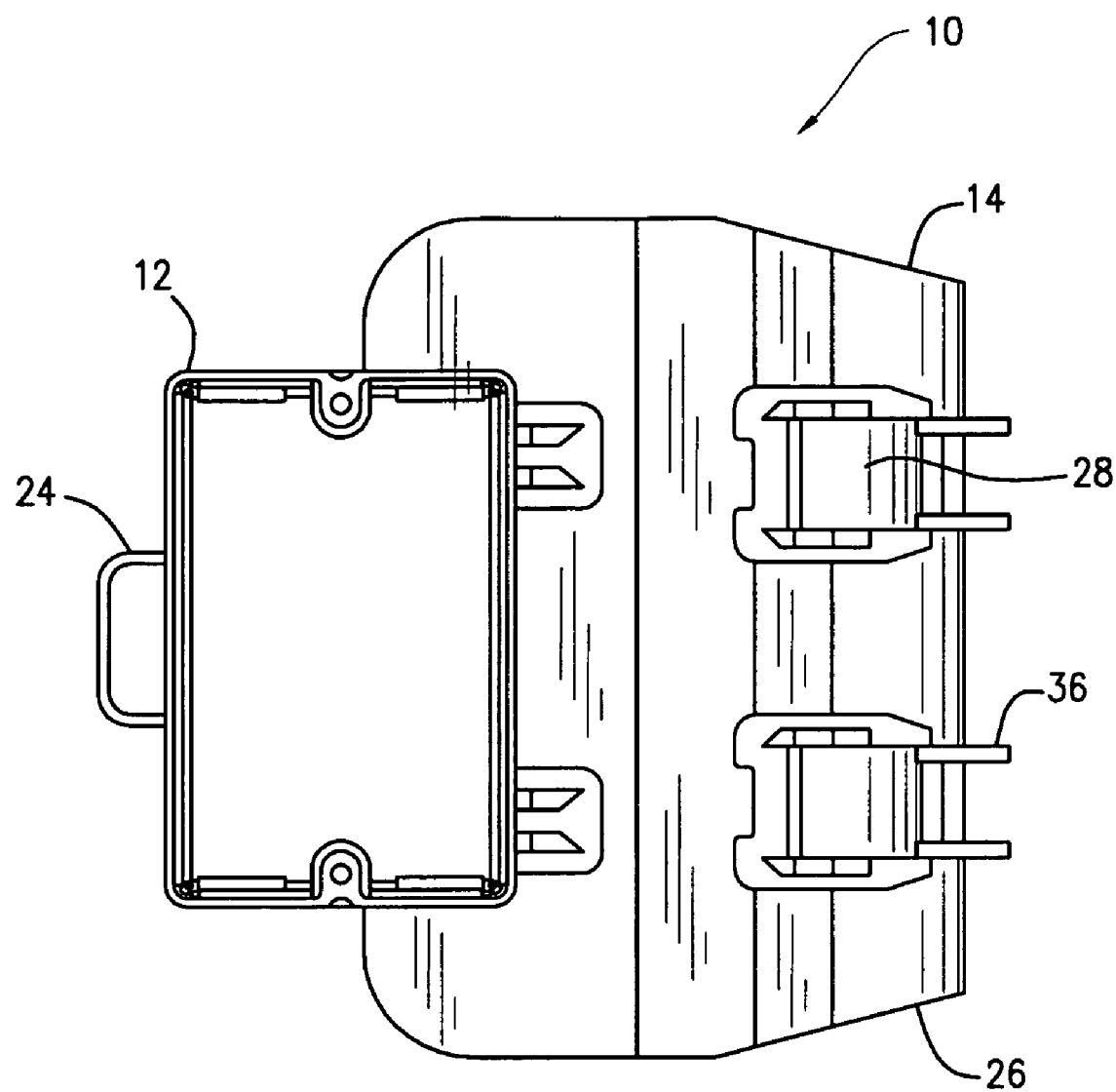
FIG. 1 is a front plan view of the invention.

Referring to the figures, there is shown box assembly 10 including box or housing 12 and bracket 14. It should be understood from the outset, that box or housing 12 can include a single or a multiple gang outlet box. Also, box 12 can include a combo box or enclosure of the type shown in U.S. Pat. No. 6,727,428 wherein both a power connection and a low voltage connection can be made. Furthermore, box 12 can include simply a low voltage frame similar to the low voltage frame shown and described in the above U.S. patent. Other structures are equally likely for box 12 and are meant to be included herein.

Box 12 is of typical construction except for the exterior configuration of adjacent side 16. Box assembly 10 is also preferably of one piece plastic construction and its method of manufacture is preferably molding, but of course a metal assembly or a combination of metal and plastic (i.e. two or more pieces) are equally suitable. Likewise, other methods of manufacture may be employed to create this assembly other than molding.

Figure 2:
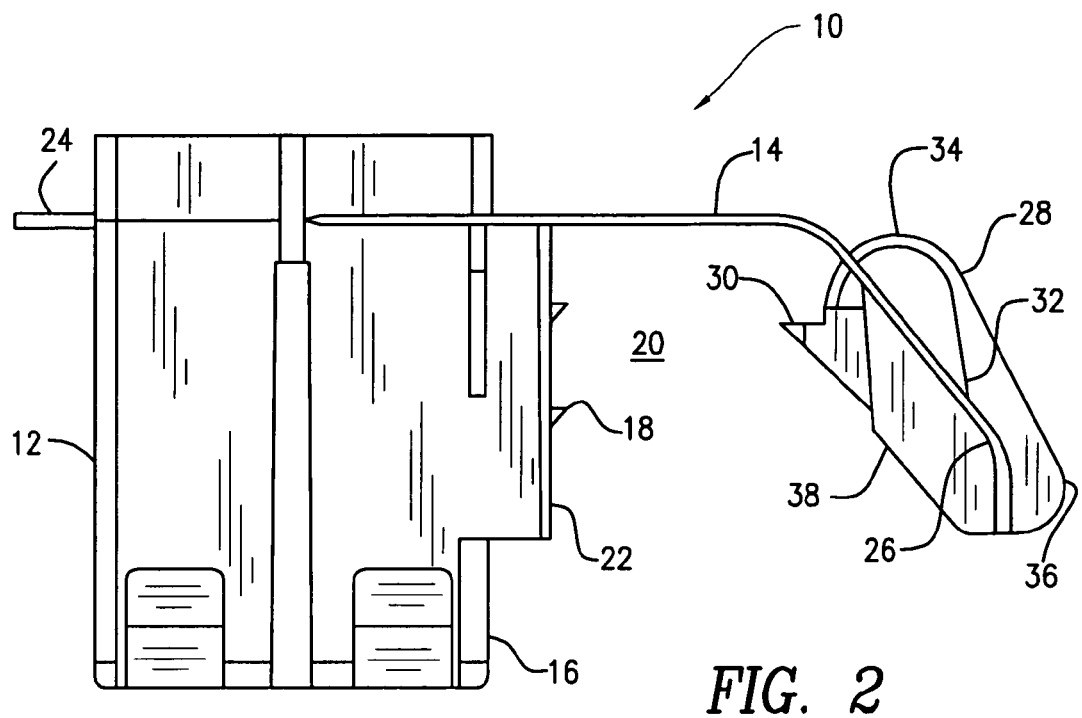
FIG. 2 is an end plan view of the invention.
Figure 4:
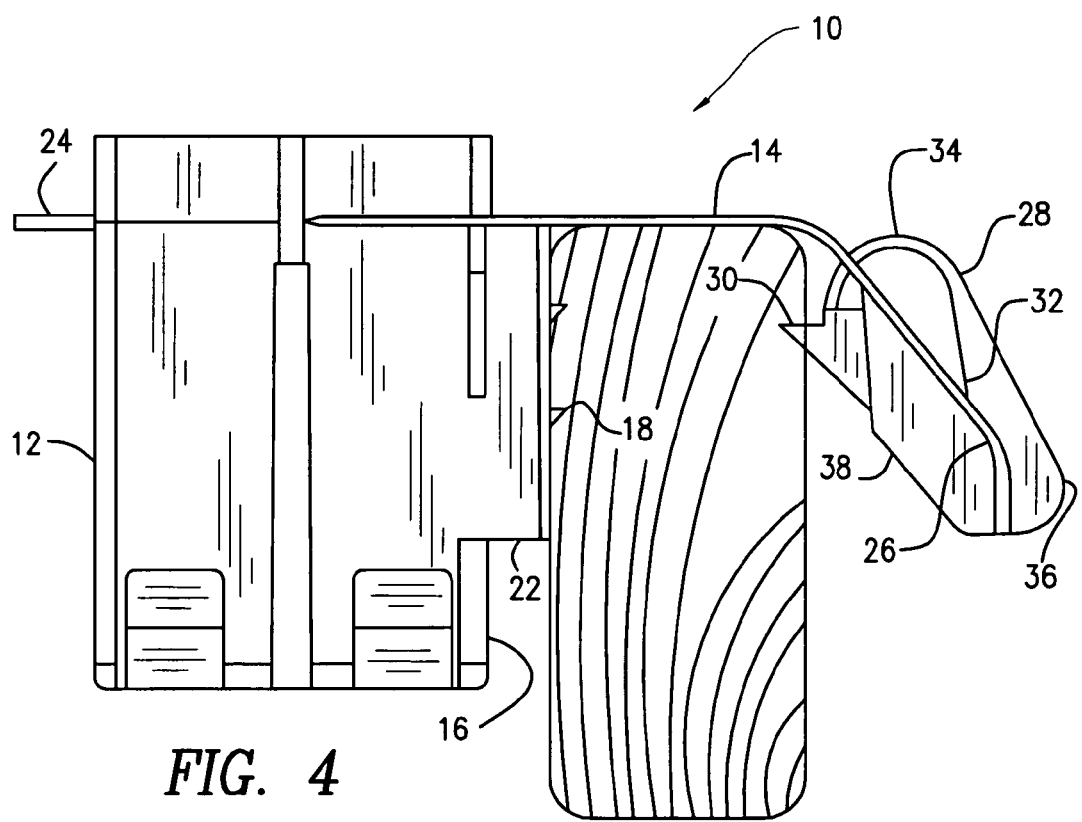
FIG. 4 is an end plan view of the invention shown installed on a stud.
Figure 3:
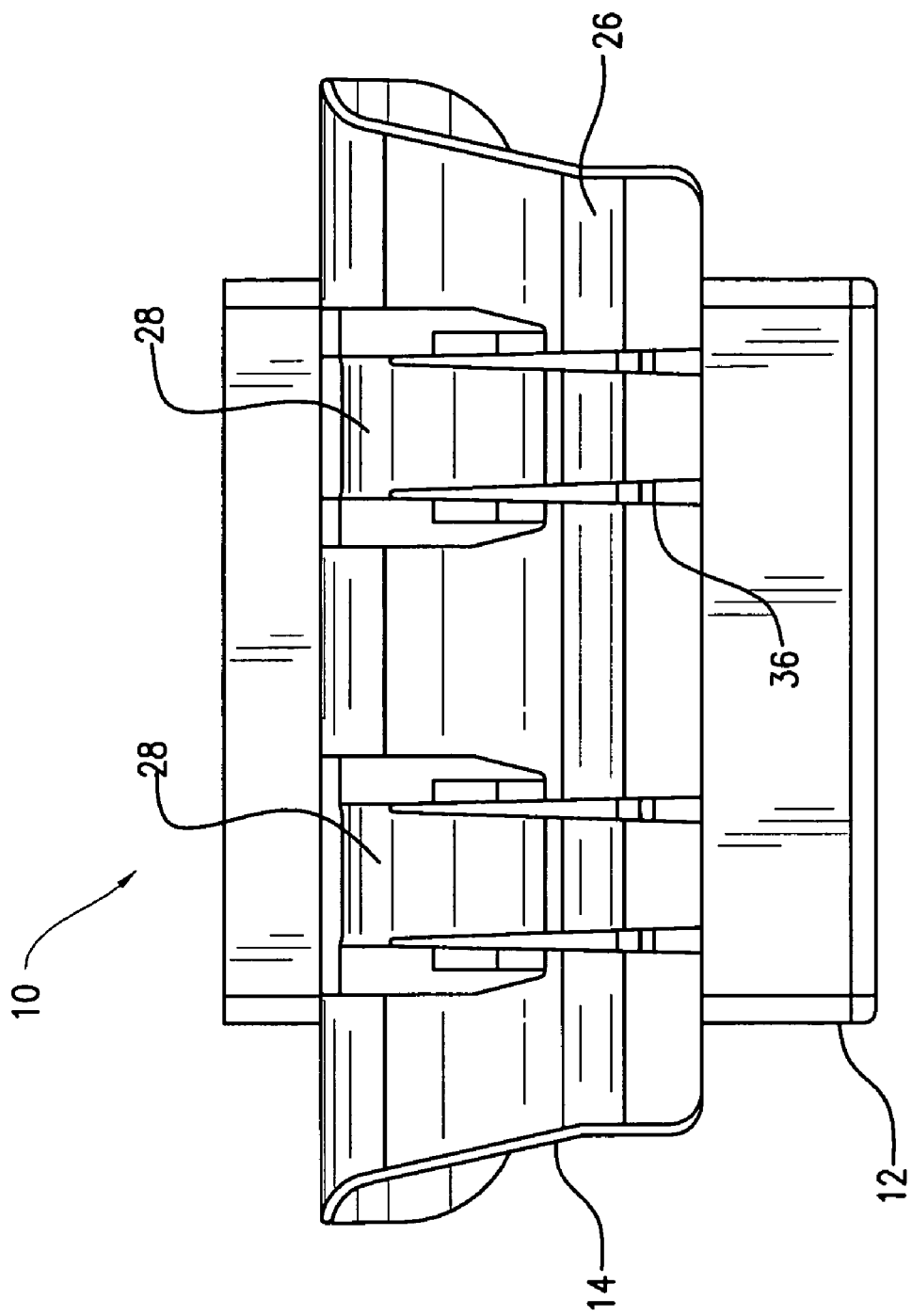
FIG. 3 is a side plan view of the invention.
Figure 5:
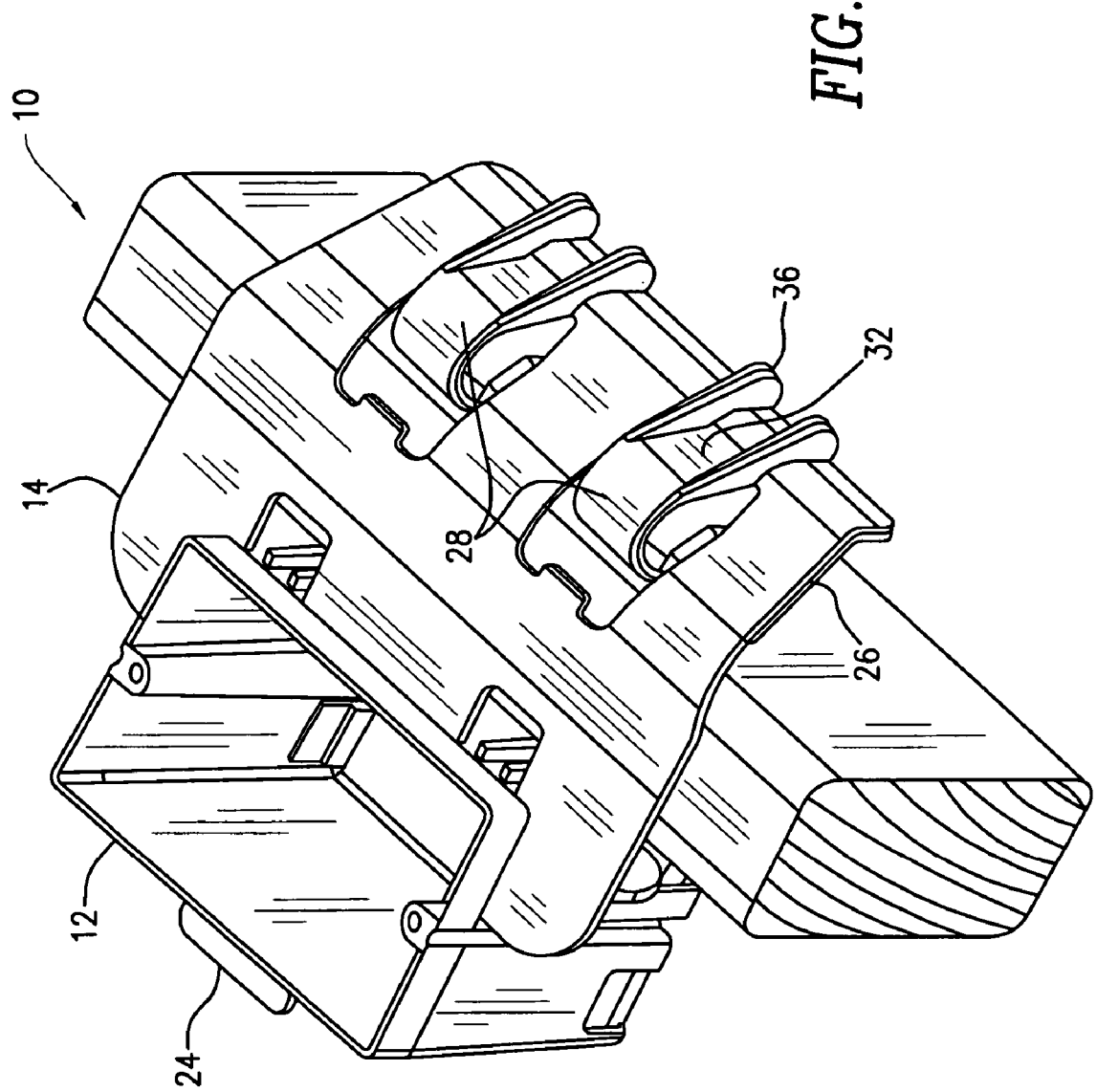
FIG. 5 is a perspective view of the invention shown installed on a stud.

In the embodiment shown, the exterior of adjacent side 16 of box 12 is configured with one or more teeth 18. These teeth 18 extend into stud cavity 20 for subsequent embedment into the stud. Such teeth 18 may or may not be separately beveled for better lodging. Also shown secured to adjacent side 16 are stand-offs 22 which help prevent box 12 from rocking on the stud either horizontally or vertically. FIG. 2 shows stand off 22 is generally parallel to side 16 and extends or is displaced from side 16 to provide a contact surface to the stud. Of course, teeth 18 extend beyond stand-offs 22. In the normal uninstalled state of box assembly 10, adjacent side 16 is generally parallel with stud cavity 20.

Bracket 14 secured to box 12 is shown inset from the front opening of box 12 so as to accommodate drywall or other wall covering that will surround the box. Opposite this bracket 14 but at the same inset depth as bracket 14 is drywall support 24. Drywall support 24 braces the drywall material adjacent the front opening of box 12. Bracket 14 is generally planar so as to permit drywall to cover it without creating any bulges.

Opposite box 12 is flange 26 forming a part of bracket 14. Flange 26 extends from the generally planar surface of bracket 14 and it, along with generally planar surface of bracket 14 and adjacent side 16 of box 12 help define stud cavity 20 therebetween.

As shown in this embodiment, flange 26 is configured with two curved deflectable springs 28. These springs 28 are cantilevered in nature and are secured at their one end to flange 26 along a lower end region thereof. The opposite extent of curved springs 28 include teeth 30 which extend into stud cavity 20 generally opposite teeth 18. To increase the rigidity of the straight portion 32 of springs 28 (as contrasted with the more flexible curved component 34 of springs 28), braces 36 are employed between this straight portion 32 and flange 26. These braces 36 insure that the deflection of springs 28 occur in the curved component 34 and not in straight portion 32 or where springs 28 connect to flange 26.

The underside of flange 26 (that side adjacent stud cavity 20) is also configured with stiffeners 38. These stiffeners 38 provide rigidity to flange 26 as well as provide a tapered alignment guide for guiding the stud into stud cavity 20.

In operation, a user would push box assembly 10 onto a stud and perhaps by using stiffeners 38 as a guide. As the stud fully enters cavity 20 it will have engaged both sets of teeth 18 and 30 on its opposite sides. Teeth 18 are rigid whereas teeth 30 are secured to deflectable curved component 34 of spring 28. Thus, once fully seated within cavity 20, the stud is gripped via both teeth sets with springs 28 providing the bias to pinch or squeeze the opposite sides of the stud.

Both teeth sets 18 and 30 are also configured to ease the insertion of the stud between them, but are angled so that once lodged or embedded in the stud, it is rather difficult to remove the stud from the grip of these teeth. It should also be pointed out that the forces applied by teeth 18 and 30 upon the stud are nearly directly opposite each other and also are generally perpendicular to the sides of the stud. Such perpendicularity to the engaged stud surface is accomplished via the curved component 34 of springs 28 since the presence of the stud in stud cavity 20 forces springs 28 directly outwardly rather than at a 45 or less degree angle to the side of the stud.

By the configuration of teeth 18 and 30, their respective tapered ends will dig into the stud even further should box assembly 10 be moved or loaded. This arrangement provides for assured and continued gripping of the stud after initial installation.

Bracket 14 may also be configured with alignment indicia (not shown) so that the installer can readily position box assembly 10 at the correct location on the stud. Such indicia may take the form of a line, a marker, a slot, an opening or something else, the chosen design being determined by the manufacturer from a variety of possibilities.

One unique feature of box assembly 10 is that it is designed so that flange 26 is not readily deflected outwardly from the stud which would result in a reduced gripping force of teeth 18 and 30 upon the stud. This is accomplished in this embodiment by teeth 30 being secured to springs 28 such that the deflection that occurs (and hence the bias that is generated) is primarily in the curved component 34 of the springs 28 and not in its straight portion 32 or in flange 26. Such engagement will result in an installed box assembly 10 that complies with code requirements that address resisting removal and/or movement.

It should be understood that while box assembly 10 has been shown with springs 28 opposite box 12 (and thereby biasing against this box 12), it is also conceivable that springs 28 can be positioned on the same side of stud cavity 20 as is box 12 so that springs 28 now bias against flange 26.

While select preferred embodiments of this invention have been illustrated, many modifications may occur to those skilled in the art and therefore it is to be understood that these modifications are incorporated within these embodiments as fully as if they were fully illustrated and described herein.

What is claimed is:

1. A bracket assembly for supporting an electrical enclosure comprising:
   an electrical enclosure having a bracket extending therefrom, said bracket having a generally planar surface and a flange opposite said electrical enclosure, said flange having an upper end attached to said planar surface and a lower end; said electrical enclosure, said generally planar surface and said flange defining a stud receiving cavity therebetween;
   one or more curved deflectable spring having an attached end and an unattached end, said attached end is secured to said lower end of said flange, said unattached end extends towards said upper end of said flange, said attached end extends into said stud receiving cavity; and
   wherein upon the insertion of a stud into said stud receiving cavity, the stud engages and deflects said deflectable spring thereby securing said electrical enclosure to said stud.

2. The bracket assembly of claim 1 wherein one side of said electrical enclosure has at least one stud gripping tooth affixed thereto.

3. The bracket assembly of claim 1 wherein said deflectable spring is configured with at least one stud gripping tooth affixed to said unattached end, wherein said at least one stud gripping tooth extending into said stud receiving cavity.

4. The bracket assembly of claim 3 wherein said deflectable spring is cantilevered and said at least one stud gripping tooth is located at a distal end thereof.

5. The bracket assembly of claim 1 wherein said deflectable spring is configured with a straight component and a curved component, said straight component extends from said attached end, said straight component is braced against movement whereas said curved component is configured to permit deflection.

6. The bracket assembly of claim 1 further comprising an alignment guide for guiding the stud into said stud receiving cavity.

7. The bracket assembly of claim 2 further comprising one or more standoffs secured to said one side of said electrical enclosure, said at least one gripping tooth on said electrical enclosure extending beyond said one or more standoffs and into said stud.

8. A bracket assembly for supporting an electrical enclosure comprising:
   an electrical enclosure having a bracket extending therefrom, wherein one side of said electrical enclosure has at least one stud gripping tooth affixed thereto, said bracket having a generally planar surface and a flange opposite said electrical enclosure; said flange having an upper end attached to said planar surface and a lower end, said electrical enclosure, said generally planar surface and said flange defining a stud receiving cavity therebetween;
   one or more curved deflectable spring having an attached end and an unattached end, said attached end is secured to said lower end of said flange, said unattached end extends towards said upper end of said flange and extends into said stud receiving cavity, and
   wherein upon the insertion of a stud into said stud receiving cavity, the stud engages and deflects said deflectable spring thereby securing said electrical enclosure to said stud.

9. The bracket assembly of claim 8 wherein said deflectable spring is configured with at least one stud gripping tooth affixed to said unattached end, wherein said at least one stud gripping tooth extending into said stud receiving cavity.

10. The bracket assembly of claim 8 wherein said deflectable spring is cantilevered and at least one stud gripping tooth is located at a distal end thereof.

11. The bracket assembly of claim 8 wherein said deflectable spring is configured with a straight component and a curved component, said straight component extends from said attached end, said straight component is braced against movement whereas said curved component is configured to permit deflection.

12. The bracket assembly of claim 8 further comprising an alignment guide for guiding the stud into said stud receiving cavity.

13. A bracket assembly for supporting an electrical enclosure comprising:
   an electrical enclosure having a bracket extending therefrom, wherein one side of said electrical enclosure has at least one stud gripping tooth affixed thereto, said bracket having a generally planar surface and a flange opposite said electrical enclosure, said flange having an upper end attached to said planar surface and a lower end; said electrical enclosure, said generally planar surface and said flange defining a stud receiving cavity therebetween;
   one or more curved deflectable spring having an attached end and an unattached end, said attached end is secured to said lower end of said flange, said unattached end extends towards said upper end of said flange and extends into said stud receiving cavity,
   one or more standoffs secured to said one side of said electrical enclosure, said at least one gripping tooth on said electrical enclosure extending beyond said one or more standoffs and into a stud, wherein upon the insertion of a stud into said stud receiving cavity, the stud engages and deflects said deflectable spring thereby securing said electrical enclosure to said stud.

14. The bracket assembly of claim 13 wherein said deflectable spring is configured with at least one stud gripping tooth affixed to said unattached end, wherein said at least one stud gripping tooth extending into said stud receiving cavity.

15. The bracket assembly of claim 14 wherein said deflectable spring is cantilevered and said at least one stud gripping tooth is located at a distal end thereof.

16. The bracket assembly of claim 15 wherein said deflectable spring is configured with a straight component and a curved component, said straight component extends from said attached end, said straight component is braced against movement
   whereas said curved component is configured to permit deflection.

* * * * *